(12) United States Patent
Sardelli

(10) Patent No.: US 7,442,314 B2
(45) Date of Patent: Oct. 28, 2008

(54) WET OXIDATION METHOD

(75) Inventor: Franco Sardelli, Bergamo (IT)

(73) Assignee: 3V Green Eagle S.p.A., Milan (IT)

( * ) Notice: Subject to any disclaimer, the term of this patent is extended or adjusted under 35 U.S.C. 154(b) by 175 days.

(21) Appl. No.: 11/154,555

(22) Filed: Jun. 17, 2005

(65) Prior Publication Data

US 2005/0279714 A1 Dec. 22, 2005

(30) Foreign Application Priority Data

Jun. 21, 2004 (IT) .......................... MI2004A1239

(51) Int. Cl.
*C02F 1/72* (2006.01)
(52) U.S. Cl. ...................... 210/761; 210/919
(58) Field of Classification Search ................ 210/761, 210/762
See application file for complete search history.

(56) References Cited

U.S. PATENT DOCUMENTS

| | | | |
|---|---|---|---|
| 3,912,626 A * | 10/1975 | Ely et al. ..................... | 210/710 |
| 3,920,506 A * | 11/1975 | Morgan ........................ | 162/31 |
| 3,977,966 A * | 8/1976 | Pradt et al. ................... | 588/316 |
| 4,774,006 A * | 9/1988 | Kaufmann ................... | 210/742 |
| 4,869,833 A | 9/1989 | Binning et al. | |
| 5,358,646 A * | 10/1994 | Gloyna et al. ............... | 210/762 |
| 5,368,750 A * | 11/1994 | Peterscheck et al. ........ | 210/761 |
| 5,614,087 A * | 3/1997 | Le .............................. | 210/180 |
| 5,651,897 A * | 7/1997 | Lehmann ..................... | 210/761 |
| 5,820,761 A * | 10/1998 | Holzer et al. ............... | 210/631 |
| 5,948,275 A * | 9/1999 | Djafer et al. ................. | 210/762 |
| 6,423,236 B1 * | 7/2002 | Shiota et al. ................. | 210/761 |

FOREIGN PATENT DOCUMENTS

EP 0 567 221 A 10/1993

* cited by examiner

*Primary Examiner*—Peter A. Hruskoci
(74) *Attorney, Agent, or Firm*—Modiano & Associati; Albert Josif; Daniel J. O'Byrne

(57) ABSTRACT

A method for wet oxidation of organic material, characterized by the utilization of the heat generated by the oxidation of the pollutants that are present in a first preheated wastewater introduced at the base of the reactor in order to provide the energy sufficient to trigger the oxidation reaction in a second wastewater, which is introduced in a higher point with respect to the base of the reactor and has a temperature that is proximate to the ambient temperature and a high concentration of pollutants; and an apparatus adapted to provide this innovative wet oxidation method.

8 Claims, 2 Drawing Sheets

WET OXIDATION METHOD

The present invention relates to a new wet oxidation method and to an apparatus particularly for performing the method.

BACKGROUND OF THE INVENTION

Wet oxidation, also known as wet-phase oxidation, is an autocatalytic process that breaks down by oxidation organic or inorganic substances that are present in a liquid phase (aqueous solutions or suspensions) by using oxygen dissolved directly in said liquid phase.

The concentration of oxidizable species can be expressed as C.O.D. (cumulative oxygen demand), which expresses the amount of oxygen in mg/l or kg/m$^3$ of water required for complete breakdown of the substances that are present.

The wet oxidation process is in itself exothermic, but to work in industrially acceptable times it is usually necessary to heat the wastewater to a temperature (generally 200-250° C.) at which the oxygen has a sufficiently high reactivity with respect to the sewage. When working at this temperature, however, it is necessary to apply intense pressures in order to keep the water in the liquid state.

At the same time, there is also a maximum temperature (generally 300-320° C., depending on the type of pollutants) that the wastewater cannot exceed. This limit arises from the fact that the maximum amount of heat that can be accumulated in the reaction water and in the gaseous phase that accompanies it (heat generated by the oxidation of the pollutants) is limited by the maximum operating temperature of the reactor and in any case cannot exceed 374° C., the temperature at which liquid water can no longer exist.

This factor is a particularly strong limitation when working with pure oxygen or oxygen-enriched air, since the limited amount of gaseous phase that is present in the reactor limits the evaporation of the water and the consequent absorption of the corresponding latent heat of evaporation. Accordingly, current processes, in order to operate safely, require the amount of pollutants treated per time unit and of introduced oxygen to not exceed certain levels set by the nature of the reaction and most of all by the practical method with which the wet oxidation is performed.

With temperatures of the input wastewater of approximately 200-270° C. and output temperatures of approximately 300-320° C., the maximum amount of oxygen that can be introduced (and therefore consumed) does not exceed 20-50 kg per cubic meter of water, whereas it would be instead highly desirable to be able to work at higher oxygen concentrations, so as to reduce the volumes of gas that pass through the reactor and have a higher amount of oxygen dissolved in the sewage (a quantity that depends on $pO_2$).

SUMMARY OF THE INVENTION

Accordingly, the aim of the invention is to provide a process for the wet oxidation of one or more organic and inorganic substances that overcomes the drawbacks of the background art.

Within this aim, one of the objects is to provide a wet oxidation process that allows to increase the C.O.D. processed per time unit without varying the internal dimensions, temperature and pressure of the reactor.

Another object is to provide a wet oxidation process as described above that allows to treat simultaneously pollutants characterized by a highly different oxidation potential.

Another object is to provide an apparatus particularly for performing a wet oxidation process as defined above.

This aim and these and other objects are achieved by a method for wet oxidation of one or more oxidizable compounds, said method comprising the step of introducing in a wet oxidation apparatus at least two wastewaters that are mutually different at least in terms of input temperature and C.O.D.

The aim and objects of the invention are also achieved by an apparatus for performing a wet oxidation process, which is characterized in that it comprises means for introducing therein at least two wastewaters that are mutually different at least in terms of input temperature and C.O.D.

BRIEF DESCRIPTION OF THE DRAWINGS

Further characteristics and advantages of the present invention will become better apparent from the description of some preferred but not exclusive embodiments thereof, wherein.

DESCRIPTION OF THE PREFERRED EMBODIMENTS

The expression "oxidizable compound" is preferably used to designate any complex organic or inorganic compound that is present in the wastewaters to be treated and often has a high environmental toxicity. The oxidizable compound is advantageously degraded as a consequence of the oxidation of its structure, where said breakdown of the compound consists for example in breaking up the initial complex structure into structurally simpler fragments characterized by lower environmental toxicity. Degradation does not necessarily have to attain complete transformation of the compound into simple products such as carbon dioxide, water, molecular nitrogen, metallic oxides, nitrogen oxides or sulfur oxides and others.

The term "apparatus" is used to designate a plant for performing a wet oxidation process, preferably the reactor or set of reactors inside which the oxidation occurs physically. The term "reactors" includes both reactors that operate continuously and reactors that operate in batch mode. When working with multiple reactors connected in series, the term "apparatus" also designates the means and parts of the plant that connect the individual reactors. This also comprises the devices required to perform the process, such as heat exchangers, wastewater collection tanks, pumps for feeding the wastewater under pressure and for modifying the operating pressure inside the reactor.

The term "wastewater" is used to designate any reagent of a conventional wet oxidation process. For example, a wastewater is an aqueous mixture of one or more organic and/or inorganic pollutants (oxidizable compounds as defined above). The wastewater can be in any physical form, advantageously an aqueous solution and/or suspension. Moreover, the invention allows to treat both monostream and multistream wastewaters, where the term "monostream" is used to designate wastewater comprising a single type of pollutant, whereas "multistream" is used to designate wastewater comprising various types of pollutants. Moreover, wastewaters according to the invention can comprise both oxidizable and non-oxidizable substances, wherein only the former are of course attacked by the oxygen.

The expression "input temperature" is used to designate the temperature of the wastewater when it is introduced in the apparatus.

The C.O.D. indirectly expresses the amount of heat that can be generated by a unit mass of the wastewater to which reference is made, since it includes the concentration and degree of oxidizability of the pollutants that are present. In other words, the C.O.D. describes the characteristics and concentration of the pollutants regardless of their chemical nature, their reactivity to oxidation and the enthalpic gain that arises from their complete oxidation.

Figure 1:
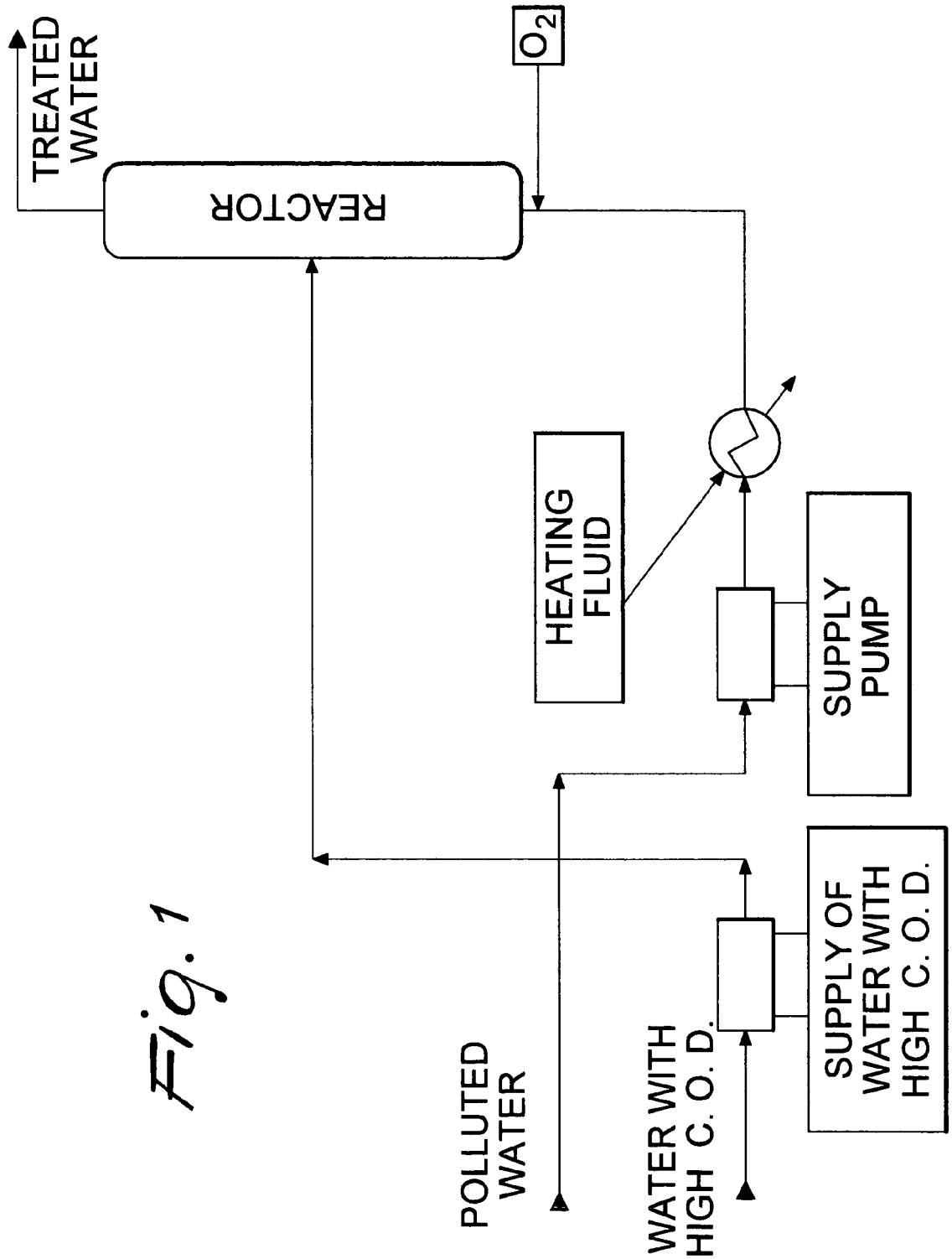
FIG. 1 is a block diagram that describes a method according to the invention, performed with the aid of an apparatus constituted by an individual reactor that operates continuously and in which a second wastewater, characterized by a high C.O.D. and by a lower temperature than the wastewater added at the input of said reactor, is added in a point that lies above the base.

In a first aspect, the invention relates to a method for wet oxidation of one or more oxidizable, organic and/or inorganic substances, the method comprising the step of introducing into an apparatus for carrying out said method as described in FIG. 1, at least two wastewaters wherein when they are introduced said wastewaters have mutually different temperatures and C.O.D. and wherein the wastewater having having a lower temperature has a higher C.O.D. and viceversa.

Although it is preferable to introduce in the apparatus only two wastewaters, it is possible to process simultaneously even more than two, on condition that within the pool of wastewaters that are introduced, at least two of them have mutually different input temperatures and C.O.D. values.

The wastewater input points are preferably "dedicated" in terms of temperature and C.O.D., in that an input point corresponds to the addition of a type of wastewater, be it a monostream or a multistream, that is characterized by a specific temperature/C.O.D. ratio. Particularly advantageously, and considering the preferred case in which there are only two wastewaters, the wastewater fed at the higher temperature has a lower C.O.D. and is introduced in a point that lies closer to the input of the apparatus with respect to the feed of the colder wastewater, which has the higher C.O.D. Preferably, the input point of the wastewater at the higher temperature coincides with the input of the apparatus, which can be the base of the first or only reactor.

In the particularly preferred case in which there are two input wastewaters, the wastewater at the higher temperature preferably has an input temperature comprised between 160° C. and 300° C., even more preferably comprised between 200° C. and 280° C., while the second (colder) wastewater preferably has an input temperature comprised between 10° C. and 160° C., advantageously equal to approximately 25° C. Regardless of the number of input wastewaters, it is advantageous for at least one wastewater to have an input temperature comprised between 200° C. and 280° C.

In the particularly preferred case in which there are two input wastewaters, the wastewater at the higher temperature has a C.O.D. comprised between 10000 mg/l and 75000 mg/l, while the wastewater at the lower temperature has a C.O.D. comprised between 75000 mg/l and 300000 mg/l.

It can be appreciated, therefore, that the method according to the invention allows to process wastewaters with a C.O.D. up to 300000 mg/l, while the background art generally cannot exceed C.O.D. values of 75000 mg/l.

In the particularly preferred case in which there are two input wastewaters, the volume of the wastewater having the lower temperature is comprised between 2.5% and 35% of the wastewater input earlier.

According to another embodiment of the invention, multiple wastewaters are introduced at gradually increasing heights from the bottom of the apparatus, so that the wastewater added in an upward position utilizes, in order to be heated, the heat generated by the oxidation of the wastewaters introduced in points that lie below it. A greater distance from the input of the apparatus is matched by a lower temperature and a higher C.O.D.

Figure 2:
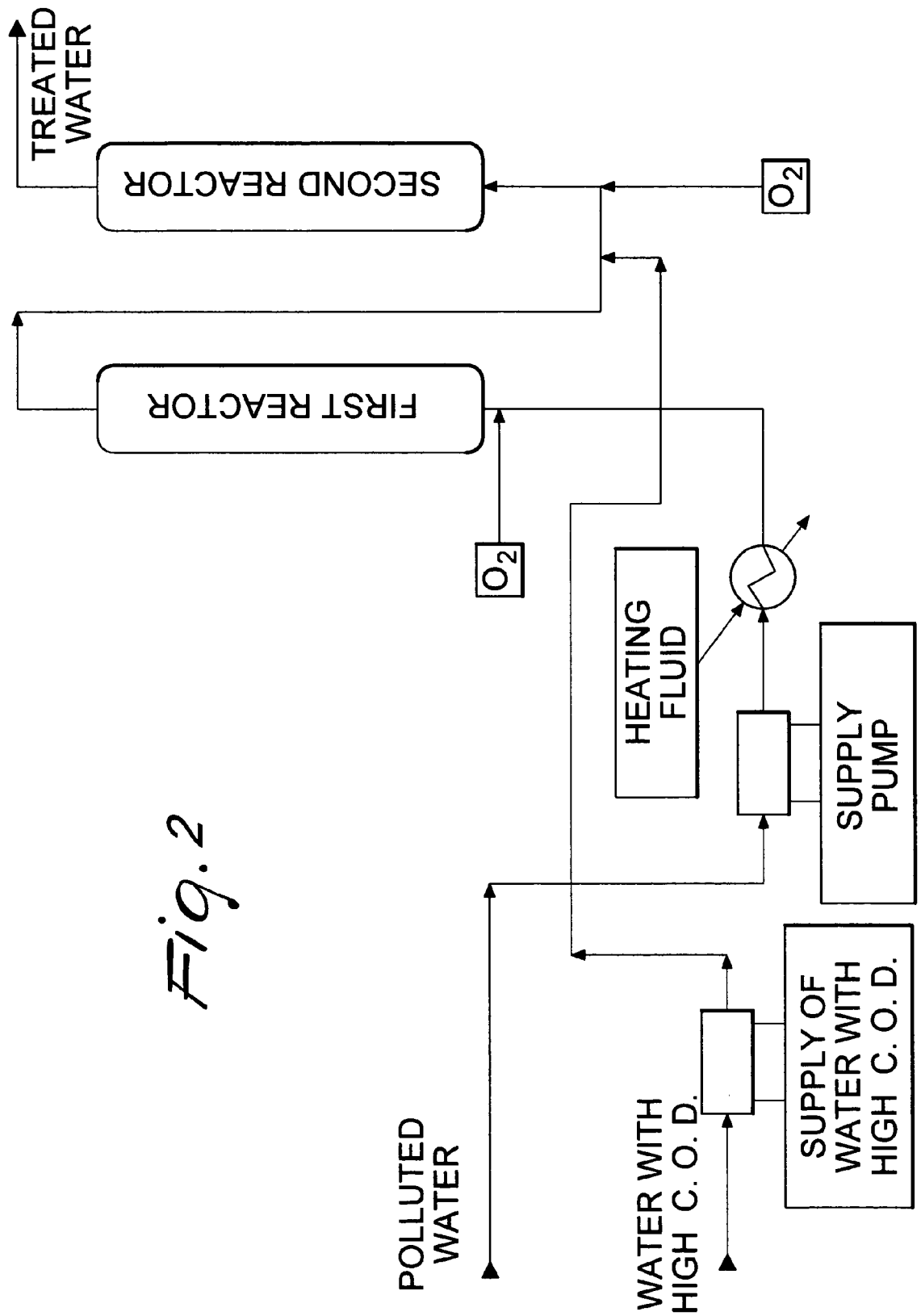
FIG. 2 is a block diagram that describes a method according to the invention, performed with the aid of an apparatus constituted by two reactors that operate in series and continuously, wherein the addition of a first wastewater at the input of the apparatus is followed by the addition, between the two reactors, of a second wastewater that is characterized by a high C.O.D. and by a lower temperature than the first wastewater.

The method according to the invention can occur equally in a continuous mode or in batch mode, in multiple reactors continuously or in a single reactor. If the method occurs continuously in multiple reactors connected in series as described in FIG. 2, the addition of wastewaters at a lower temperature is performed advantageously after the first reactor. If the method is performed in batch mode, the addition of the second wastewater or of the additional wastewaters does not occur simultaneously with the introduction of the first wastewater. In particular, the subsequent addition or additions is, or are, preferably performed after a time interval typically comprised between 10 and 60 minutes, so that the mixture inside the reactor can reach a level (typically a temperature comprised between 160° C. and 300° C.) high enough to allow the continuation of the oxidation reaction.

With respect to conventional methods and for equal operating conditions and apparatus characteristics, the method according to the invention allows to achieve the significant advantage of increasing considerably the amount of oxygen consumed, with the consequence of increasing the amount of pollutants that can be oxidized per time unit.

One of the fundamental differences between conventional wet oxidation processes and the method according to the invention therefore resides in the combined treatment of a first wastewater characterized by a conventional C.O.D., introduced for example at the base of the reactor advantageously after a preliminary heating step, and of at least one second wastewater, introduced in a point that lies further from the input point of the first wastewater and, with respect to the first wastewater, is characterized by a lower temperature and a higher C.O.D. It is believed that the first wastewater transfers part of the energy stored therein to the second wastewater, so as to bring it to a temperature at which the oxidation reaction can assume a rate that is compatible with an industrial process. The second wastewater (i.e., the wastewater at a lower temperature), however, has a higher C.O.D., and therefore oxidation resumes without altering the thermal balance of the reaction (i.e., the temperature differential between the input point and the output point of the apparatus remains constant). In other words, the heat generated by the oxidation of a wastewater that has a particularly high C.O.D. but is fed at a low temperature compensates for the heat transferred to it by the first wastewater, so as to keep the average temperature of the apparatus at a level that is compatible with swift and regular oxidation of the pollutants and most of all so as to maintain a temperature gradient that is optimized beforehand so as to provide the best oxidation yields. In the background art, treatment of wastewaters with particularly high C.O.D. values was difficult to perform and in any case impossible with conventional methods, as it would have required a considerable dilution of the wastewater. On the basis of what has been described, once the wastewater input points have been set, the higher the C.O.D. delta, the higher the temperature delta must be.

The person skilled in the art will easily understand that the advantages described, which arise from the input of a cold and concentrated wastewater, can be applied to many other situations that have not been specified explicitly. For example, it is possible to add, at a same input level (distance from the base of the reactor), two or more wastewaters having a different C.O.D., calculating their input temperatures so as to keep the total temperature differential between the base and the apex of the apparatus unchanged.

In a preferred embodiment, at least one wastewater is introduced at the base of the wet oxidation apparatus and is brought beforehand to the temperature at which the oxidation reaction is triggered by means of a preheating step, so that it supplies heat to the wastewaters introduced subsequently, which are colder, advantageously at ambient temperature.

It is also possible to preheat more than one single wastewater, wherein each wastewater is brought to a different temperature and accordingly is introduced in the apparatus at a different height from the input point.

In another aspect, the invention relates to an apparatus particularly for providing a wet oxidation method, characterized in that it comprises means for introducing in said apparatus at least two wastewaters, wherein said wastewaters have mutually different temperatures and C.O.D. values, wastewater introduction occurring advantageously in at least two different points located at different heights with respect to the base of said apparatus, and wherein an increase in the input height is matched by a reduction in the temperature and an increase in the C.O.D. of the input wastewater.

All the characteristics described with reference to the method according to the invention are to be considered valid, when applicable, also with reference to the apparatus, although they have not been repeated explicitly.

Suitable and preferred means for introducing the at least two wastewaters in the apparatus are pumps, heat exchangers, flow-rate and pressure measurement and adjustment devices, flow control valves, adjustment valves, blocking and safety valves, etc.

An apparatus for performing a wet oxidation process according to the invention already has many advantages per se. However, it is possible to achieve even greater advantages if said apparatus is used in combination with a lining such as the one disclosed in a co-pending patent application by the same Applicant. Said lining is characterized in that it comprises at least two different metallic alloys, wherein a first alloy is selected from the group that comprises titanium and alloys thereof and a second alloy is selected from the group that comprises nickel alloys.

The expression "titanium and alloys thereof" is used to refer to titanium of any grade, preferably titanium grades 1 to 4 (chemically pure titanium), titanium grades 7 to 11 (alloys of titanium, palladium, aluminum and vanadium) and titanium grade 45 (titanium-niobium alloys) and mixtures thereof. The referenced grades refer to the classification of nonferrous materials proposed by the ASME and ISPESL or by equivalent standards.

The expression "nickel alloys" preferably refers to a nickel-chromium alloy, even more preferably a nickel-chromium-molybdenum alloy. Among nickel-chromium alloys and nickel-chromium-molybdenum alloys, preferred alloys comprise alloys containing at least 30% nickel by weight, preferably in a percentage comprised between 30% and 75% by weight. Examples of preferred nickel alloys are selected from the group that comprises Sanicro® alloys, preferably Sanicro 28® (or NO8028), Incoloys alloys, preferably NO8800, Inconel® alloys, preferably NO6600, Hastelloy® alloys, preferably NO10276, NO6022, NO6455 and NO6059, wherein the designations that are not referenced as trademarks refer to the international classification proposed by ASME.

In a preferred embodiment, the lining is constituted substantially by non-overlapping surfaces of suitable thickness, in which a first surface is preferably constituted by titanium or alloys thereof and a second surface is preferably constituted by nickel alloys.

Advantageously, the thickness of the lining might not be the same in all regions and is in any case at least 0.75 millimeters, preferably comprised between 0.75 and 12.7 millimeters, more preferably equal to 5 millimeters.

Advantageously, the lining of the invention is coupled to an optional substrate by means of a generic anchoring method, in which the thickness of the layer is comprised advantageously between 20 and 150 mm. The anchoring step occurs according to any method known in the field for this purpose and particularly by plating, performed either by lamination or by explosion.

Advantageous examples of substrate are metal sheets or forgings made of carbon steel, carbon-manganese steel or low-alloy steels, having adequate mechanical characteristics and manufactured according to international standards, such as for example the ferrous materials classified by the ASME standards (ASME II Part A).

In a particularly preferred embodiment, the lower part of the reactor is lined with titanium or alloys thereof and the upper part of the reactor is lined with nickel alloys.

According to a preferred embodiment, the two lower and upper regions of the apparatus are provided separately by covering two or more sections of the substrate with the lining according to the invention and are then joined together with any method known in the field for this purpose, such as for example flanging.

According to a preferred embodiment, the area lined with titanium is comprised advantageously between 5% and 95% of the internal volume of the apparatus and the area lined with nickel is advantageously comprised between 5% and 95% of the internal volume of the apparatus. Preferred ratios between the areas lined with the two alloys are 10/90 and 20/80, wherein the larger portion can be equally constituted by titanium or nickel.

If one decides to combine the advantages of the apparatus according to the invention with the advantages that arise from a lining such as the one described above, the practical method by means of which the apparatus is provided is not an essential aspect of the invention, and any method known in the field for this purpose can be used, on condition that it allows to provide a product that is suitable for its intended use.

In the case of reactors with a diameter of more than 1 meter, it is preferable to work directly the lined plates, for example by calendering, so as to provide the two portions, the lower one and the upper one, of the walls of the reactor. The plated cylindrical portions are then joined typically by flanging, so as to obtain the finished reactor.

For reactors having dimensions of less than 1 meter, particularly less than 800 mm, the diameter of the reactor is too small to allow to proceed by calendering layers of pre-lined substrate. In this case, one uses advantageously a manufacturing method such as hot forcing, which comprises a first step of anchoring the lining of the invention to a substrate that has a thickness typically comprised between 10 and 50 mm, preferably 25 mm. The individual lined sections constitute the internal portion of the reactor, and after being manufactured they are inserted while hot in a perforated external cylindrical jacket, typically made of non-plated steel, having a thickness comprised between 20 and 150 mm.

Further characteristics and advantages of the present invention will become better apparent from the description of the following preferred embodiments, intended exclusively by way of non-limiting example.

EXAMPLE 1

A partial wet oxidation apparatus, in which wastewater of a chemical factory and various aqueous wastes originating externally are treated which are characterized by the following parameters: a) C.O.D. 20000-50000 mg/l, b) chlorides: 20000-50000 mg/l (as Cl$^-$), c) sulphates: 5000-20000 mg/l (as SO$_4^{2-}$), d) suspended solids: 1000-15000 mg/l.

The reaction parameters are: temperature: 250-310° C.; pressure: 110-150 bars.

The apparatus works with three reactors in series, each having an inside diameter of approximately 0.75 meters and a height of approximately 9 meters.

During normal operation, the first reactor was supplied with wastewater with a C.O.D. of 40000 mg/l at a flow-rate of 12 m$^3$/h (equal to approximately 12600 kg/h) and oxygen in a stoichiometric quantity (480 kg/h) at a temperature of 250° C. The reaction proceeded regularly with a temperature gradient of approximately 50° C. (output temperature from the third reactor equal to approximately 300° C.) and conversion (C.O.D. reduction) of more than 75%. The output temperature from the first reactor was approximately 265° C.

1.2 m$^3$/h of a wastewater with a high. C.O.D. (160000 mg/l) at ambient temperature (approximately 25° C.) were then added in the second reactor, simultaneously increasing the amount of oxygen fed (up to 670 kg/h) so as to keep the stoichiometric ratio between oxygen and C.O.D. constant.

Due to the addition of the cold wastewater, the bottom temperature of the second reactor decreased to approximately 245° C. (from the initial 265° C.), but due to the higher reaction heat generated as a consequence of the addition of C.O.D. the output temperature from the third reactor remained practically unchanged.

Although in the text only some embodiments of the invention have been described, the person skilled in the art will understand immediately that the invention, in all of its aspects, is susceptible of variations and modifications, all of which are within the scope of the appended claims and are adapted to obtain other equally advantageous embodiments.

The disclosures in Italian Patent Application No. MI2004A001239 from which this application claims priority are incorporated herein by reference.

What is claimed is:

1. A method for the wet oxidation of one or more oxidizable compounds, comprising the steps of introducing into a wet oxidation apparatus oxygen, introducing in the wet oxidation apparatus a first wastewater having a first COD and a first input temperature between 200° C. and 280° C., and subjecting the first wastewater to wet oxidation to obtain a reaction mixture at a reaction temperature, and introducing in the wet oxidation apparatus in the reaction mixture a second wastewater having a second COD and a second input temperature equal to 25° C. and subjecting the second wastewater to wet oxidation, the reaction temperature and the second input temperature being such as to allow continuation of wet oxidation of the first wastewater and wet oxidation of the second wastewater, the CODs being reduced by the wet oxidation of the wastewaters.

2. The method according to claim 1, wherein the first and second wastewaters are aqueous solutions or suspensions.

3. The method according to claim 1, wherein the first and second wastewaters are monostream or multistream.

4. The method according to claim 1, wherein the first wastewater is introduced in a point of the wet oxidation apparatus that is closer to an inlet of the apparatus with respect to the second wastewater.

5. The method according to claim 4, wherein the first wastewater is introduced at the inlet of the apparatus.

6. The method according to claim 1, wherein the first C.O.D. is between 10000 mg/l and 75000 mg/l.

7. The method according to claim 1, wherein the second C.O.D. is between 75000 mg/l and 300000 mg/l.

8. The method according to claim 1, wherein a first volume of the first wastewater and a second volume of the second wastewater are introduced in the wet oxidation apparatus and the introduced second volume of second wastewater is between 2.5 and 35% of the first introduced volume of first wastewater.

* * * * *